US008627534B2

(12) United States Patent
Van Dyke et al.

(10) Patent No.: US 8,627,534 B2
(45) Date of Patent: Jan. 14, 2014

(54) CLEANING FEATURE FOR ELECTRIC CHARGING CONNECTOR

(75) Inventors: Christopher Hugo Van Dyke, San Francisco, CA (US); Scott Ira Kohn, Redwood City, CA (US); Vineet Haresh Mehta, San Francisco, CA (US); Troy A. Nergaard, San Francisco, CA (US)

(73) Assignee: Tesla Motors, Inc., Palo Alto, CA (US)

( * ) Notice: Subject to any disclaimer, the term of this patent is extended or adjusted under 35 U.S.C. 154(b) by 309 days.

(21) Appl. No.: 13/090,952

(22) Filed: Apr. 20, 2011

(65) Prior Publication Data
US 2012/0266914 A1 Oct. 25, 2012

(51) Int. Cl.
*B08B 9/00* (2006.01)
*B08B 1/00* (2006.01)

(52) U.S. Cl.
USPC .................. 15/21.1; 15/97.1; 15/106; 15/118; 134/6; 134/8

(58) Field of Classification Search
USPC .................. 15/97.1, 21.1, 106, 118; 439/387; 134/6, 8
See application file for complete search history.

(56) References Cited

U.S. PATENT DOCUMENTS

| | | | | |
|---|---|---|---|---|
| 5,909,100 A | * | 6/1999 | Watanabe et al. | 320/108 |
| 5,921,803 A | * | 7/1999 | Mori | 439/387 |
| 5,984,706 A | * | 11/1999 | Kakuta et al. | 439/310 |
| 2002/0048138 A1 | * | 4/2002 | Rose et al. | 361/302 |
| 2006/0176639 A1 | * | 8/2006 | Hunter | 361/143 |

FOREIGN PATENT DOCUMENTS

JP 2011182534 A * 9/2011

* cited by examiner

*Primary Examiner* — Alexander Markoff
(74) *Attorney, Agent, or Firm* — J. Richard Soderberg

(57) ABSTRACT

A contamination cleaner for a socket of a charging connector used with a charging station for an electric vehicle wherein the charging connector mates to a charging coupler of the electric vehicle during charging includes a housing mechanically configured generally similarly to the charging coupler enabling the housing to mechanically mate to the charging connector; and a cleaning contact, coupled to the housing and complementary to the socket, for engaging the socket and removing surface contaminants from the socket whenever the housing mechanically mates to the charging connector.

10 Claims, 4 Drawing Sheets

CLEANING FEATURE FOR ELECTRIC CHARGING CONNECTOR

BACKGROUND OF THE INVENTION

The present invention relates generally to charging stations for energy storage systems, and more specifically, but not exclusively, to automatic cleaning of contact sockets of a coupler used with an electric vehicle charging station.

As electric vehicles (EVs) become more prevalent, there is a corresponding increase of installations for charging stations used with the EVs. These charging stations are installed at public and private locations, with either of the installations being classified as an indoor or an outdoor installation.

Each charging station includes an electrical coupler that includes two or more contacts that mate with the charging system of the EV. Dust and grime builds up on the contacts over time, particularly for electrical couplers used in public and/or outdoor installations. This contamination decreases the life of the electrical coupler and increases the electrical contact resistance between the coupler and the EV charging system. (Particulate contamination further provides a physical barrier on the contact surfaces that dramatically increases the contact resistance of a mated connection.)

Charging efficiency is very important in EV charging because of the large amounts of energy typically transferred during operation. Reducing charging inefficiencies is a system-wide goal for manufacturers, operators, and users. Outdoor charging stations are at great risk for developing unacceptable levels of contamination, particularly those in dusty areas. Public charging stations that are used many times per day are also at increased risk. Thus outdoor public charging stations that are used frequently have, in general, the greatest risk of wasting significant amounts of energy and user time.

To combat the contamination, these charging stations have a maintenance schedule in which a technician periodically cleans the contacts. The more at risk charging stations may have more frequent maintenance schedules, with any increase in maintenance schedule directly increasing operating costs for the charging station and decreasing availability for charging. Any on-site automatic maintenance performed between technician cleanings may extend the schedule and decrease costs and improve day-to-day charging efficiencies. Particularly as it can be the case that unplanned for increases of contamination between maintenance cleanings results in unacceptable charging efficiencies in the interim between the increase and the cleaning.

What is needed is an automatic cleaning contact apparatus and method that performs regular light cleaning of the contact surfaces.

BRIEF SUMMARY OF THE INVENTION

Disclosed is an automatic cleaning contact apparatus and method that performs regular light cleaning of the contact surfaces. The following summary of the invention is provided to facilitate an understanding of some of technical features related to EV charging, and is not intended to be a full description of the present invention. A full appreciation of the various aspects of the invention can be gained by taking the entire specification, claims, drawings, and abstract as a whole.

A contamination cleaner for a socket of a charging connector used with a charging station for an electric vehicle wherein the charging connector mates to a charging coupler of the electric vehicle during charging includes a housing mechanically configured generally similarly to the charging coupler enabling the housing to mechanically mate to the charging connector; and a cleaning contact, coupled to the housing and complementary to the socket, for engaging the socket and removing surface contaminants from the socket whenever the housing mechanically mates to the charging connector.

A cleaning method for removing contamination from a socket of a charging connector used with a charging station for an electric vehicle wherein the charging connector mates to a charging coupler of the electric vehicle during charging includes a) mating a housing to the charging connector when the charging connector is disengaged from the electric vehicle; and b) engaging the socket with a cleaning contact of the housing to automatically remove surface contaminants from the socket whenever the housing mates to the charging connector.

Contact resistance, particularly contact resistance caused by foreign particulate matter on active contacts of a charger coupler, is simply and effectively reduced by implementations of the present invention. The user is not impacted at all by the passive maintenance action and there is no user training or alteration of the user's actions to obtain benefits of the present invention. In some cases, timing of technician visits for regular maintenance is extended, reducing costs and increasing availability of the charging stations employing the present invention.

The present invention is versatile and may be used with stationary or mobile chargers having one or more charging connectors. Stationary chargers may have the cleaning contact(s) incorporated in a housing element that supports/stores the charging connector between uses. Mobile chargers may have the cleaning contact(s) incorporated into a cap used for the mobile charging connector that covers the mobile connector between uses.

Other features, benefits, and advantages of the present invention will be apparent upon a review of the present disclosure, including the specification, drawings, and claims.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

FIG. 5 illustrates a cleaning structure with wide wiper sections;

FIG. 6 illustrates a cleaning structure having one or more cleaning balls;

FIG. 7 illustrates a cleaning structure having simple bristles;

FIG. 8 illustrates a cleaning structure having one or more foam cones;

FIG. 9 illustrates a cleaning structure including one or more spirally wound cleaning elements; and FIG. 10 illustrates a cleaning structure including one or more flexible surfaces arranged into a barbed or "christmas tree" configuration.

DETAILED DESCRIPTION OF THE INVENTION

Embodiments of the present invention provide an automatic cleaning contact apparatus and method that performs regular light cleaning of the contact surfaces of a charging connector. The following description is presented to enable one of ordinary skill in the art to make and use the invention and is provided in the context of a patent application and its requirements. Various modifications to the preferred embodiment and the generic principles and features described herein will be readily apparent to those skilled in the art. Thus, the present invention is not intended to be limited to the embodiment shown but is to be accorded the widest scope consistent with the principles and features described herein.

Figure 1:
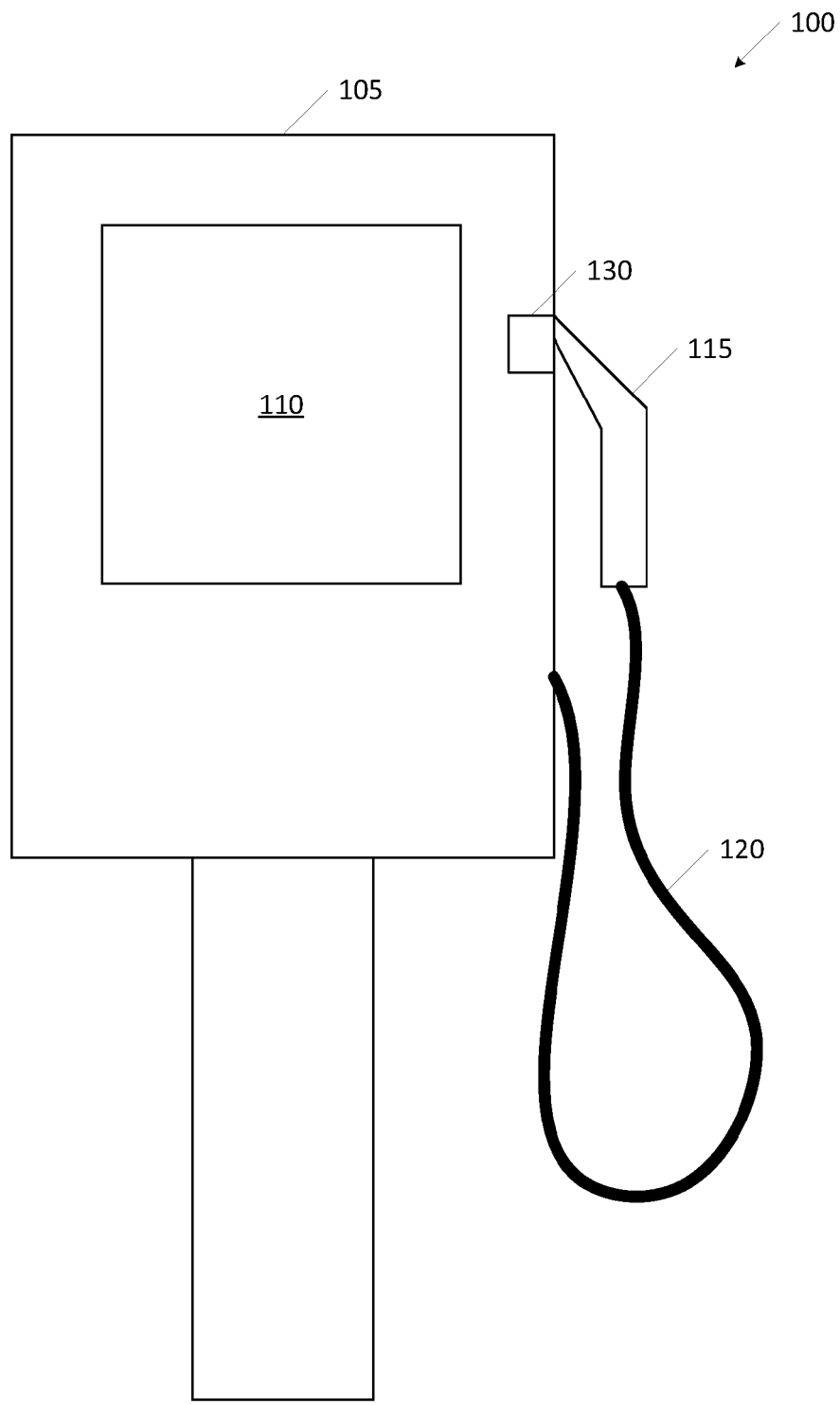
FIG. 1 illustrates a schematic representation of a stand-alone electric vehicle charging station.

FIG. 1 illustrates a schematic representation of a stand-alone electric vehicle (EV) charging station 100 such as would be used at a public and/or outdoor installation. Station 100 includes a housing 105 supporting an informational/control interface 110 for receiving user input and displaying information. A charging connector 115 is communicated to housing 100 using a cord 120. When not in use, connector 115 is "hung" up on at an attachment point 130 of housing 100.

Figure 2:
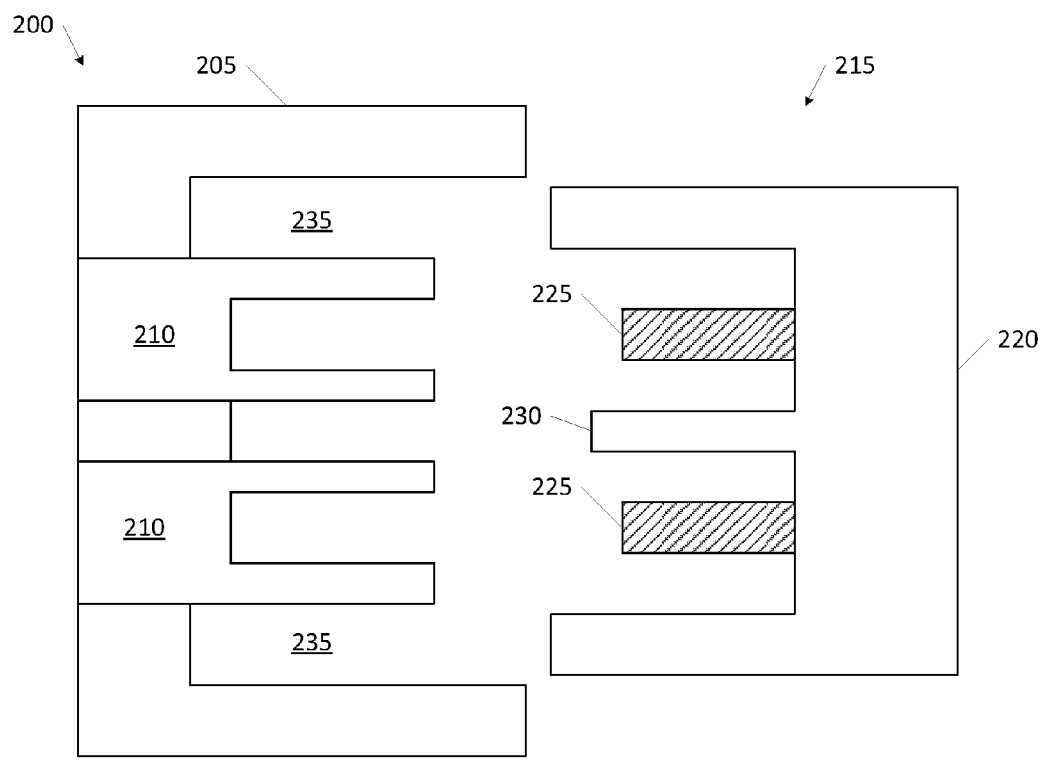
FIG. 2 illustrates a schematic block diagram of interface details of an embodiment of the present invention with the charging connector shown in FIG. 1.

FIG. 2 illustrates a schematic block diagram of interface details of an embodiment of the present invention with a portion 200 of charging connector 115 (connector 115 shown in FIG. 1). Portion 200 includes a shell housing 205 supporting active electrical sockets 210. Housing 205 insulates and protects the user from accidental contact with sockets 210 and provides some environmental protection for sockets 210 as well as providing a desired mating interface for connection to a complementary mating interface of the EV.

Sockets 210 are shown as female sockets carrying charging energy for delivery to the energy storage system of an EV. In FIG. 2, portion 200 is shown with two female electrical sockets 210, however the present invention is not limited to a particular number or type (e.g., female or male) of active sockets.

A cleaning coupler 215 including an embodiment of the present invention mechanically mates to portion 200 and therefore includes a housing 220 complementary to housing 205. Housing 220 supports one or more cleaning contacts 225 that interface with socket(s) 210 of portion 200. (In some cases, contacts 225 are referred to as "dummy" pins in that they replicate in varying detail, mechanical interface structure of electrical contacts used in the EV to receive charging power from socket(s) 210.) Housing 220 is located at attachment point 130 shown in FIG. 1.

Cleaning contact 225 engages a corresponding socket 210 and removes surface contaminants from socket 210 whenever housing 220 mechanically mates to housing 205. Housing 220 may include one or more optional guide pins 230 to guide cleaning contact 225 into cleaning engagement with socket 210 by matching to a guide channel 235 in housing 205. Typically walls of housing 220 are sufficient to mate the cleaning contact(s) with the socket(s).

There are many configurations for cleaning contact 225 and many ways that contact 225 may engage socket 210 and remove contaminants. Some of these configurations and ways are further described herein to illustrate a range of implementations of the present invention but are not intended to limit its scope.

In operation, a user decouples connector 115 from the charging power coupler of their EV and stores connector 115 on station 100 in some fashion, such as by "hanging" or the like. Preferably housing 220 is incorporated into housing 105 and is part of the storage system for connector 115. Each time a user stores connector 115, housing 205 (part of connector 115) engages housing 220 to automatically engage cleaning contact(s) 225 with socket(s) 210. This passively removes surface contaminants from socket(s) 210 and decreases contact resistance of socket(s) 210 when a subsequent user operates station 100.

Preferably the cleaning by contact(s) 225 is gentle (e.g., non-abrasive) to socket(s) 210 and is implemented in a way that can be transparent to the user. Each and every time connector 115 is stored at station 100, contact(s) 225 passively remove surface contaminants from socket(s) 210. The transparency refers to the user not being impacted at all including no training sessions or alterations to normal routines used when charging their EV from charging station 100. One of the features of the present invention is leveraging an action that is often, if not always, performed (i.e., storing connector 115 in housing 105) with the associated passive cleaning/maintenance action (e.g., removing contaminants from socket(s) 210). This offers improved useful life for the socket(s) and reduces risks of overheating as well as some upside in passively improving day-in day-out charging efficiency, all without significant cost or user inconvenience while in some cases decreasing certain scheduled maintenance tasks which reduces costs and increases availability of station 100.

Socket(s) 210 are typically silver plated over a copper core. The construction style and type of materials is most relevant in that this information helps to ensure that an implemented solution for cleaning contact(s) 225 is gentle enough to not unduly wear out socket(s) 210 when used as described herein. A preferred implementation includes a pliable polymer material arranged in a soft bristle format that has an effective diameter at least slightly greater than an inside diameter of socket(s) 210.

Preferably cleaning contact(s) 225 are implemented to simply remove dirt, dust, and in some cases moisture/water, but are not designed to be abrasive enough to remove any intended coating(s) and/or oxide layer(s) installed on an inner surface of socket(s) 210. In some cases where an oxide layer is provided on contact surfaces of sockets 210 that is essential to surface protection, the surface contaminants targeted by the present invention for cleaning would be more destructive to the oxide layer if left in place during electrical mating than is the case with the cleaning action of contacts 225 when removing such surface contaminants.

In addition to stationary charging stations 100, there are mobile charging stations that in some cases may not include the same type of housing or other structure devoted to "hanging" up connector 115. In such cases, those connectors 115 associated with a mobile charging solution can have a cover or cap offering some environmental protection to inhibit ingress of contaminants and the like (as well as reducing risks to the user from accidental contact). Housing 220 may be incorporated into such a cover or cap and operate in a similar fashion to automatically clean surface contaminants from socket(s) 210 each time that the cover or cap is placed on connector 115.

It is not required that contacts 225 will need servicing or maintenance. In some cases where cleaning of contacts 225 is necessary or desirable, a custom tool is available that resembles portion 200 but having cleaning elements substituted for socket(s) 210.

Figure 3:
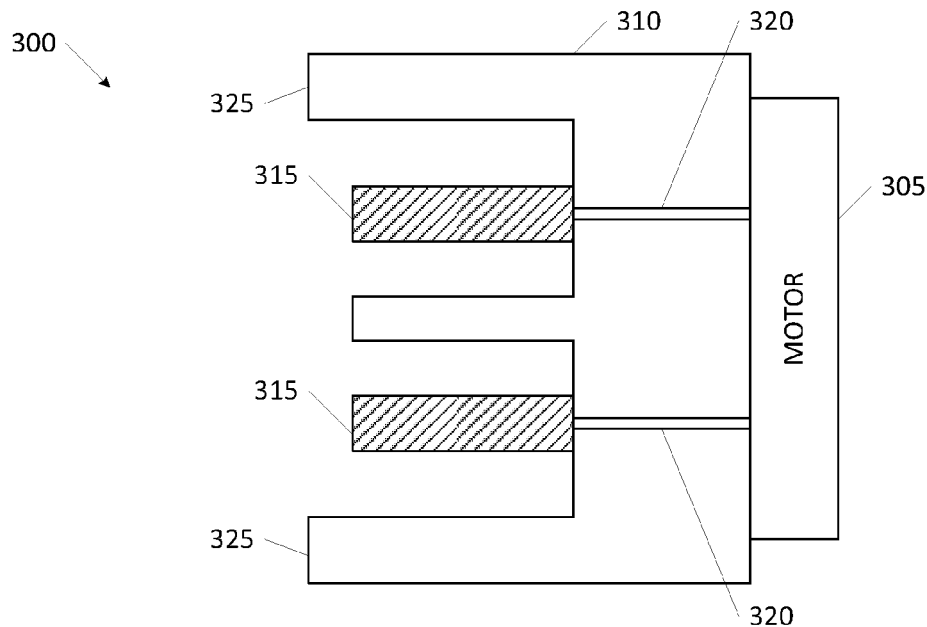
FIG. 3 illustrates a schematic block diagram of an alternate implementation of the present invention incorporating a motor.

FIG. 3 illustrates a schematic block diagram of an alternate implementation of the present invention for a cleaning coupler 300 incorporating a motor 305. Cleaning coupler 300 mechanically mates to portion 200 shown in FIG. 2 and provides a housing 310 complementary to housing 205. Housing 310 supports one or more active cleaning contacts 315 that interface with socket(s) 210 of portion 200. Contacts 315 have a linkage 320 that couples to motor 305 to produce the desired cleaning action, with motor 305 driving the cleaning action through an appropriate linkage 320.

Cleaning contact 315 engages a corresponding socket 210 and removes surface contaminants from socket 210 whenever housing 310 mechanically mates to housing 205 or on a regular schedule. Housing 310 may include a housing with optional guiding features 325 to guide cleaning contact 315 into cleaning engagement with socket 210 by matching to guide channel 235 in housing 205.

Cleaning coupler 300 includes a mechanically-implemented linkage 320 to provide a mechanical cleaning action. Contact 315 may rotate about an longitudinal axis, linearly move parallel to the axis, or pitch/yaw the axis. Rotation preferably includes reciprocating motion in which there is rotation of contact 315 in one direction and then in the opposite direction inside socket 210. Reciprocating linear movement of contact 315 provides for contact 315 to advance into and retreat from socket 210. Pitching/yawing "tilts" contact 315 within socket 315. There are many different ways to implement the various described representative cleaning actions, details of which are outside the scope of the present invention.

Figure 4:
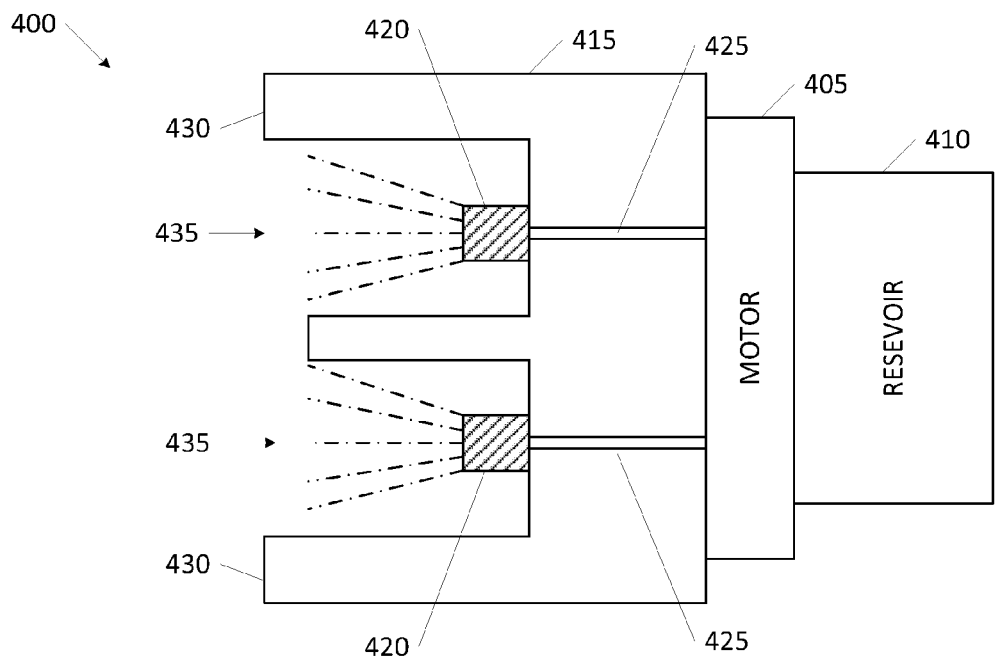
FIG. 4 illustrates a schematic block diagram of an alternate motorized implementation of the present invention.

FIG. 4 illustrates a schematic block diagram of an alternate motorized implementation of the present invention for a cleaning coupler 400. In contrast to coupler 300, coupler 400 incorporates a pumping motor 405 to drive a cleaning fluid or solvent from a reservoir 410. Coupler 400 includes a housing 415 supporting motor 405 and reservoir 410. Cleaning coupler 400 mechanically mates to portion 200 shown in FIG. 2 and provides housing 415 complementary to housing 205. Housing 415 supports one or more active cleaning contacts 420 that interface with socket(s) 210 of portion 200. Contacts 420 have a linkage 425 that couples to motor 405 to produce the desired cleaning action by coupling contents of reservoir 410 to contact(s) 420, with motor 405 driving the cleaning action by pumping fluid/solvent under pressure through linkage 425.

Cleaning contact 420 engages a corresponding socket 210 and removes surface contaminants from socket 210 whenever housing 415 mechanically mates to housing 205. Housing 415 may include one or more guide pins 430 to guide cleaning contact 420 into cleaning engagement with socket 210 by matching to guide channel 235 in housing 205.

Cleaning coupler 400 includes a pressurized fluid implemented linkage 425 to provide a mechanical cleaning action that includes communicating a stream of the pressurized fluid from motor 405 to contact 420. Contact 420 includes one or more nozzles, jets and the like to produce a spraying action or the like that directs one or more streams 435 of the fluid/solvent from reservoir 410 into socket 210 to flush, dislodge, and the like to remove surface contaminants from socket 210. Some implementations may include a hybrid solution that includes both a mechanical cleaning action and a pressurized fluid cleaning action. There are many different ways to implement the various described representative cleaning actions, details of which are outside the scope of the present invention.

FIG. 5 through FIG. 10 illustrate representative cleaning contacts for use with various implementations of the present invention described herein.

Figure 5:
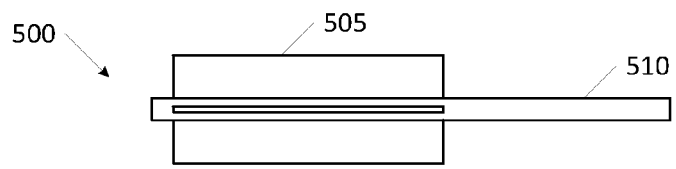
FIG. 5 through FIG. 10 illustrate representative cleaning contacts for use with various implementations of the present invention.

FIG. 5 illustrates a cleaning structure 500 with a plurality of wide wiper sections 505 disposed on a shaft 510. Cleaning structure 500 may be preferably used with coupler 300 including a rotating cleaning action for the cleaning contact.

Figure 6:
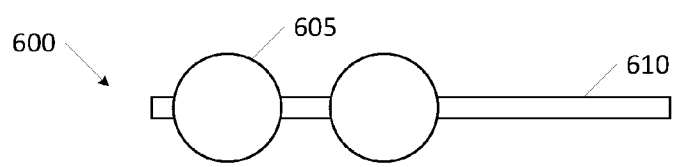

FIG. 6 illustrates a cleaning structure 600 having one or more cleaning balls 605 disposed on a shaft 610. A series of such balls 605 (more generally an ovoid periphery) along shaft 610 preferably have a diameter at least slighter greater than an inside diameter of sockets 210. Balls 605 may be hollow or solid core.

Figure 7:
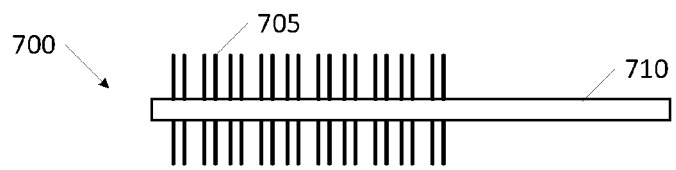

FIG. 7 illustrates a cleaning structure 700 having simple bristles 705 disposed on a shaft 710. Bristles 705 extend in multiple directions generally perpendicular to shaft 710.

Figure 8:
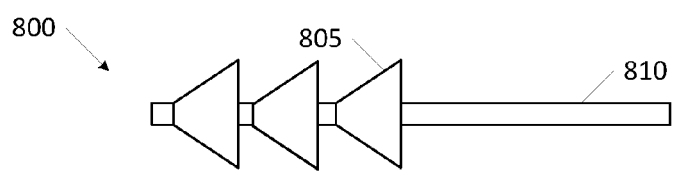

FIG. 8 illustrates a cleaning structure 800 having one or more foam (or similar resilient material) cones 805 disposed on a shaft 810. Cones 805 may be hollow or solid core.

Figure 9:
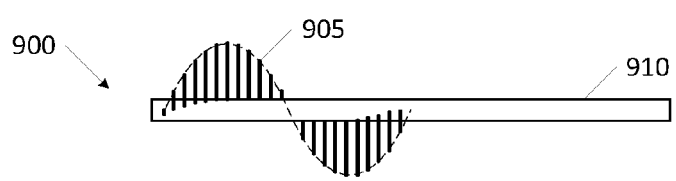

FIG. 9 illustrates a cleaning structure 900 including one or more spirally wound cleaning elements 905, element(s) 905 wound about a shaft 910.

Figure 10:
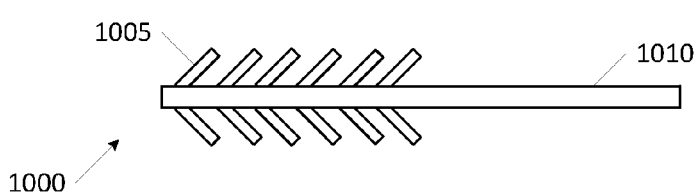

FIG. 10 illustrates a cleaning structure 1000 including one or more generally "flat" flexible cleaning surfaces 1005 arranged into a barbed or "christmas tree" configuration relative to a shaft 1010. Cleaning structure 1000 provides for surfaces 1005 to "flatten" as shaft 1010 is inserted into socket 210 and expand outwardly as shaft 1010 is withdrawn from socket 210.

Preferably the embodiments shown in FIG. 5 through FIG. 10 all share a similar construction element that a profile of the peripheral of the cleaning/dislodging elements is slightly larger than the inside diameter of socket 210.

As noted herein, the system and process are most preferably implemented in a charging station (stationary, mobile or otherwise) for an electric vehicle. The present invention may be implemented for virtually any charging station having connectors of differing number, shapes, orientations, and types than described herein or on any electrical connector having pin and socket contacts. While the overall cleaning is described as passive insofar as the cleaning occurs in conjunction with some other required action of the user, in some embodiments the cleaning contacts include one or more active cleaning actions, such as driven by a motor or the like.

The system and methods above has been described in general terms as an aid to understanding details of preferred embodiments of the present invention. Other preferred embodiments of the present include the described application for a contact cleaning apparatus and method. In the description herein, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention.

Reference throughout this specification to "one embodiment", "an embodiment", or "a specific embodiment" means that a particular feature, structure, or characteristic described in connection with the embodiment is included in at least one embodiment of the present invention and not necessarily in all embodiments. Thus, respective appearances of the phrases "in one embodiment", "in an embodiment", or "in a specific embodiment" in various places throughout this specification are not necessarily referring to the same embodiment. Furthermore, the particular features, structures, or characteristics of any specific embodiment of the present invention may be combined in any suitable manner with one or more other embodiments. It is to be understood that other variations and modifications of the embodiments of the present invention described and illustrated herein are possible in light of the teachings herein and are to be considered as part of the spirit and scope of the present invention.

It will also be appreciated that one or more of the elements depicted in the drawings/figures can also be implemented in a more separated or integrated manner, or even removed or rendered as inoperable in certain cases, as is useful in accordance with a particular application.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated embodiments of the present invention, including what is described in the Abstract, is not intended to be exhaustive or to limit the invention to the precise forms disclosed herein. While specific embodiments of, and examples for, the invention are described herein for illustrative purposes only, various equivalent modifications are possible within the spirit and scope of the present invention, as those skilled in the relevant art will recognize and appreciate. As indicated, these modifications may be made to the present invention in light of the foregoing description of illustrated embodiments of the present invention and are to be included within the spirit and scope of the present invention.

Thus, while the present invention has been described herein with reference to particular embodiments thereof, a latitude of modification, various changes and substitutions are intended in the foregoing disclosures, and it will be appreciated that in some instances some features of embodiments of the invention will be employed without a corresponding use of other features without departing from the scope and spirit of the invention as set forth. Therefore, many modifications may be made to adapt a particular situation or material to the essential scope and spirit of the present invention. It is intended that the invention not be limited to the particular terms used in following claims and/or to the particular embodiment disclosed as the best mode contemplated for carrying out this invention, but that the invention will include any and all embodiments and equivalents falling within the scope of the appended claims. Thus, the scope of the invention is to be determined solely by the appended claims.

What is claimed as new and desired to be protected by Letters Patent of the United States is:

1. A charging station for an electric vehicle comprising:
   a charging connector having a form factor that matches a charging coupler of the electric vehicle; and
   incorporated into the charging station, a contamination cleaner for the charging connector, the contamination cleaner comprising:
      a housing complementary to the form factor of the charging connector, the housing configured to mechanically mate with a charging connector having the form factor; and
      coupled to the housing, a cleaning contact complementary to a socket of the charging connector, the cleaning contact comprising a pliable polymer material arranged in a soft bristle format, the cleaning contact having an effective diameter greater than an inside diameter of the socket of the charging connector, the cleaning contact configured to mechanically engage with the socket when the housing mechanically mates with the charging connector to remove surface contaminants.

2. The charging station of claim 1, wherein the housing includes a guide pin complementary to a mating channel of the charging connector, and wherein the guide pin engages the mating channel to guide the cleaning contact into cleaning engagement with the socket when the housing mates with the charging connector.

3. The charging station of claim 1, wherein the pliable polymer material is non-abrasive to the socket.

4. The charging station of claim 1, wherein the contact element has a shaft and includes one or more structures selected from the group consisting of a brush coupled to the shaft, a wiper coupled to the shaft, an ovoid disposed on the shaft, a bristle generally perpendicularly disposed on the shaft, a cone disposed on the shaft, a contactor spirally-wound about the shaft, an elongate members generally non-perpendicularly disposed on the shaft, and combinations thereof.

5. The charging station of claim 1, further comprising a motorized assembly coupled to the housing and to the cleaning contact, wherein the motorized assembly actuates a cleaning action of the cleaning contact relative to the socket.

6. The charging station of claim 5, wherein the cleaning action includes a rotation of said cleaning contact within the socket.

7. The charging station of claim 5, wherein the cleaning action includes a linear reciprocating motion of the cleaning contact within the socket.

8. The charging station of claim 5, wherein the cleaning action includes a pitching motion of the cleaning contact within the socket.

9. The charging station of claim 5, wherein the motorized assembly further includes a pumping motor and a fluid reservoir including a cleaning solution, wherein the cleaning contact includes a spray nozzle coupled to the fluid reservoir and to the pumping motor to direct a stream of the cleaning solution from the spray nozzle into the socket.

10. The charging station of claim 1, wherein the contamination cleaner is part of a storage system for the charging connector.

* * * * *